United States Patent
Busha et al.

(10) Patent No.: US 7,429,068 B2
(45) Date of Patent: Sep. 30, 2008

(54) REMOVABLE STORAGE CONSOLE

(75) Inventors: Bryan Busha, Grand Blanc, MI (US); Joseph Wieczorek, Lake Orion, MI (US); Rodney Slobodian, Sterling Hts., MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 374 days.

(21) Appl. No.: 11/242,291

(22) Filed: Oct. 3, 2005

(65) Prior Publication Data

US 2007/0046058 A1 Mar. 1, 2007

Related U.S. Application Data

(60) Provisional application No. 60/712,532, filed on Aug. 29, 2005.

(51) Int. Cl.
B60R 7/04 (2006.01)
(52) U.S. Cl. .................. 296/24.34; 296/37.8; 296/37.7
(58) Field of Classification Search ............... 296/97.8, 296/24.35, 37.7, 37.14
See application file for complete search history.

(56) References Cited

U.S. PATENT DOCUMENTS

| | | | |
|---|---|---|---|
| 4,783,110 A | 11/1988 | Beukema et al. | |
| 4,796,791 A | 1/1989 | Goss et al. | |
| 5,085,481 A | 2/1992 | Fluharty et al. | |
| 5,106,143 A | 4/1992 | Soeters | |
| 5,338,081 A | 8/1994 | Young et al. | |
| 5,397,160 A | 3/1995 | Landry | |
| 5,746,363 A | 5/1998 | Teller et al. | |
| 6,086,129 A | 7/2000 | Gray | |
| 6,116,674 A | 9/2000 | Allison et al. | |
| 6,135,529 A | 10/2000 | De Angelis et al. | |
| 6,367,857 B2 | 4/2002 | Kifer et al. | |
| 6,428,072 B1 | 8/2002 | Moore | |
| 6,435,587 B1 | 8/2002 | Flowerday et al. | |
| 6,481,773 B1 | 11/2002 | Salani et al. | |
| 6,497,441 B1 | 12/2002 | Mahmood et al. | |
| 6,497,443 B2 | 12/2002 | Worrell et al. | |
| 6,547,299 B2 | 4/2003 | Atanasiu et al. | |
| 6,572,169 B2 | 6/2003 | Panhelleux et al. | |
| 6,588,821 B2 | 7/2003 | Worrell et al. | |
| 6,616,206 B2 | 9/2003 | Luginbill et al. | |
| 6,619,716 B1 | 9/2003 | Sturt | |
| 6,644,705 B2 | 11/2003 | Wikman et al. | |
| 6,652,024 B2 | 11/2003 | Prasatek | |
| 6,655,561 B2 | 12/2003 | Panhelleux et al. | |
| 7,258,381 B2 * | 8/2007 | Sturt et al. | 296/24.34 |
| 2001/0035670 A1 | 11/2001 | Prasatek | |
| 2002/0057002 A1 | 5/2002 | Pegorier | |
| 2002/0089203 A1 | 7/2002 | Flowerday et al. | |
| 2002/0140246 A1 | 10/2002 | Worell et al. | |
| 2003/0047955 A1 | 3/2003 | Bruhnke et al. | |
| 2003/0122392 A1 | 7/2003 | Larsen et al. | |
| 2003/0127877 A1 | 7/2003 | Luginbill et al. | |
| 2004/0066053 A1 | 4/2004 | Fero | |

* cited by examiner

Primary Examiner—Joseph D Pape
(74) Attorney, Agent, or Firm—Raggio & Dinnin, P.C.

(57) ABSTRACT

A removable storage console for use in a vehicle. The console includes a base and a body. The console also includes a handle on the outside of the body. A link member is connected to the handle. An upper housing is secured to a bottom portion of the body. A lower housing is secured to the upper housing. The console includes a plurality of latches arranged between the lower housing and the body member. The console is removable from and capable of being secured at multiple positions within the vehicle.

24 Claims, 10 Drawing Sheets

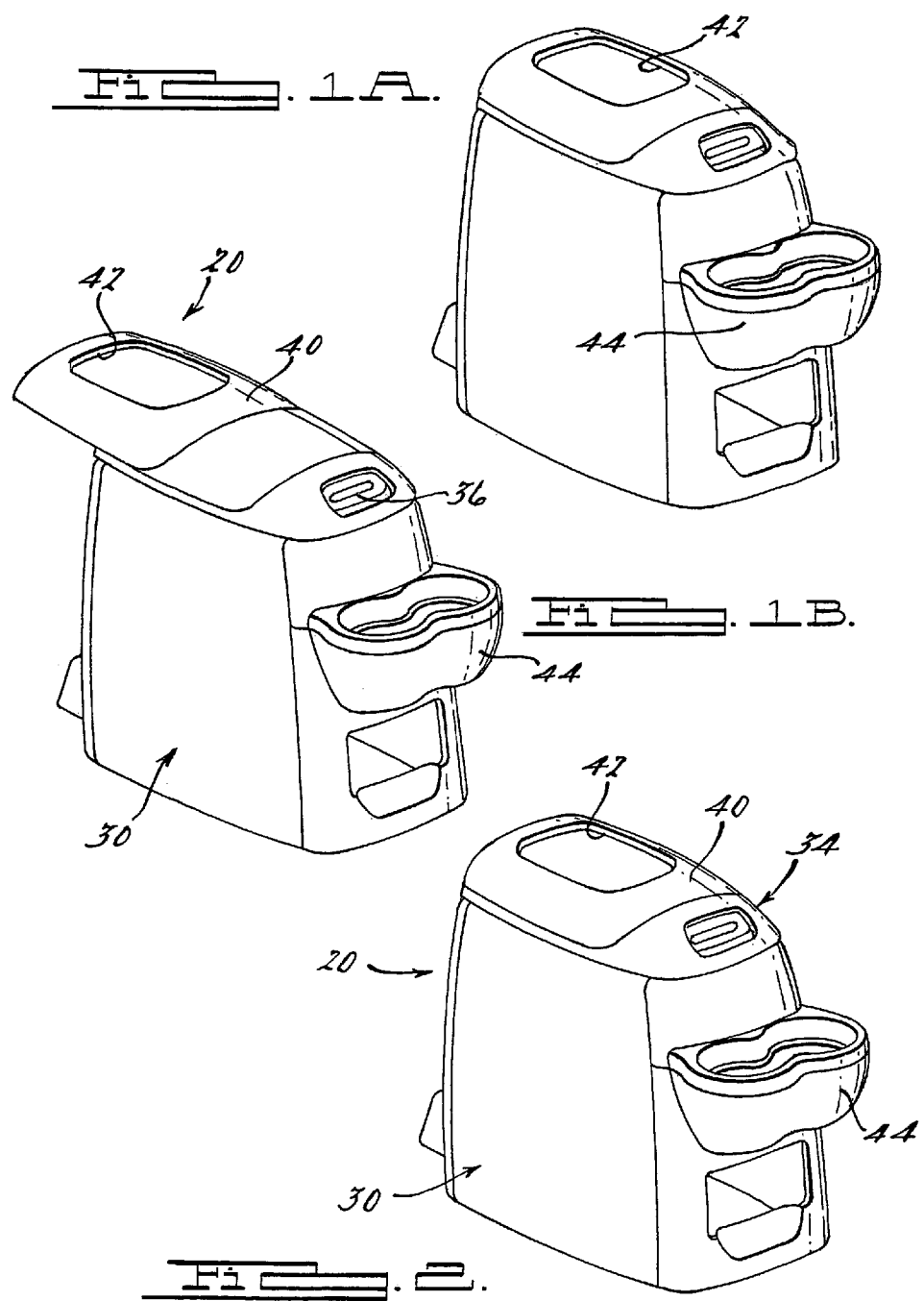

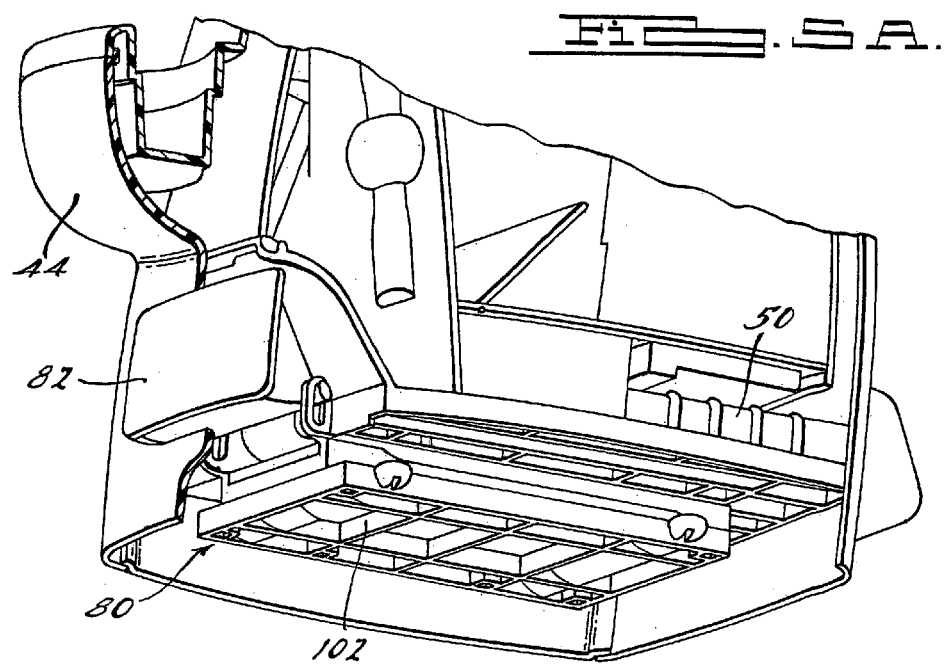
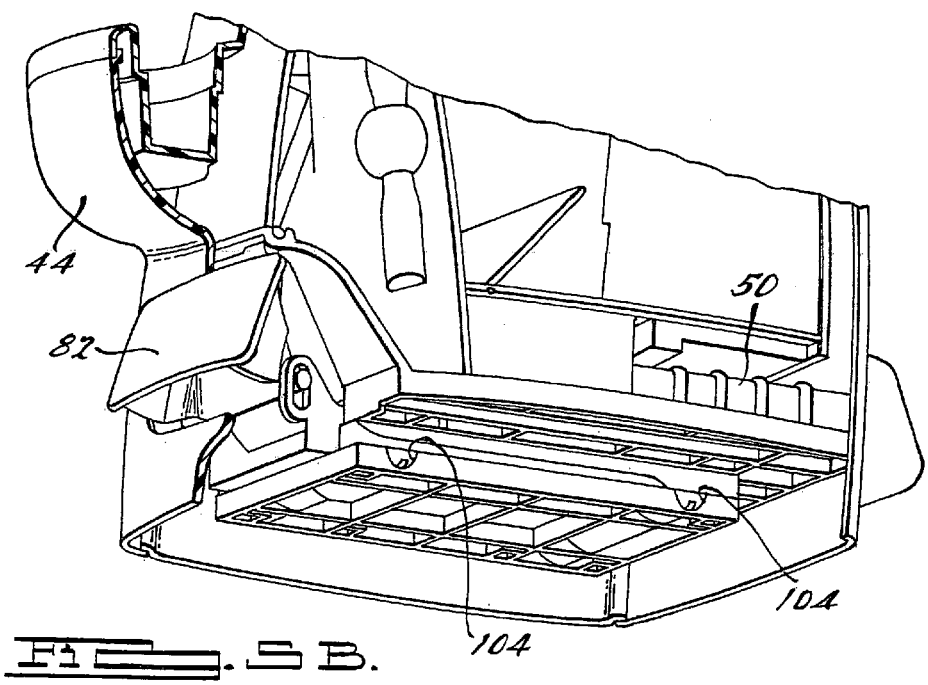

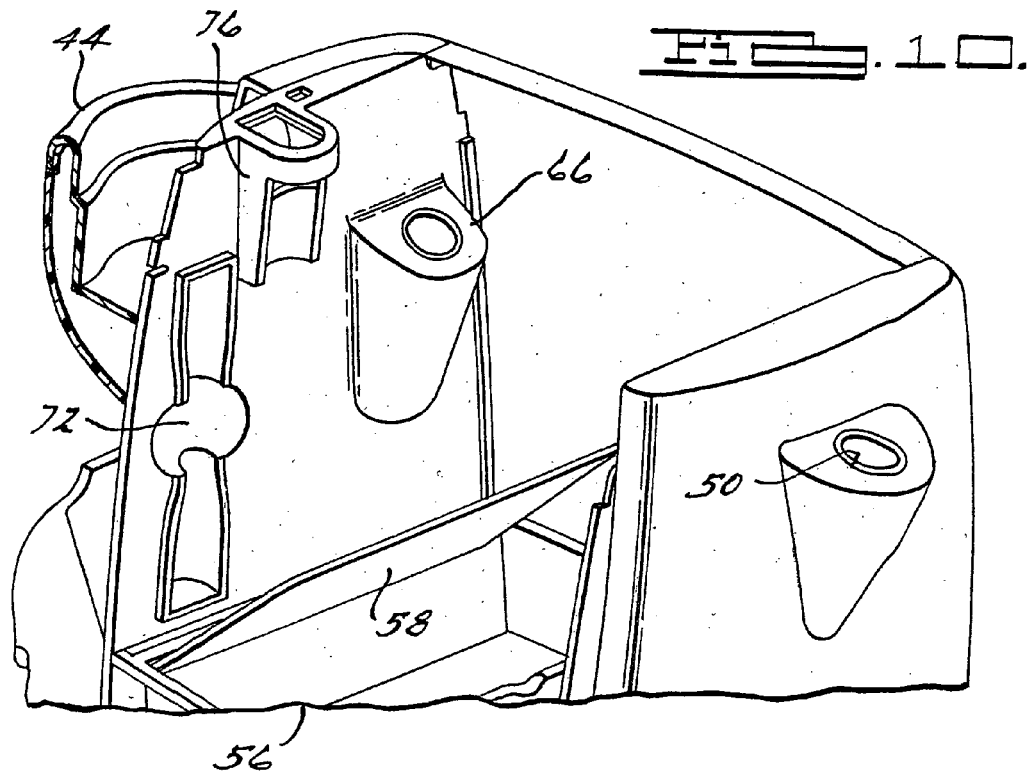
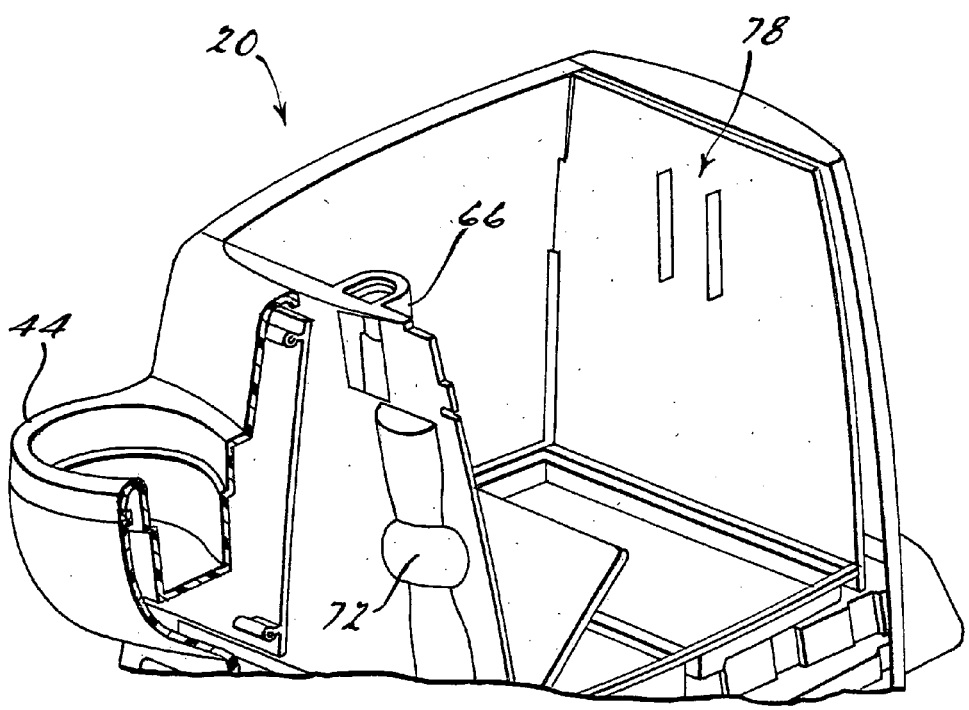

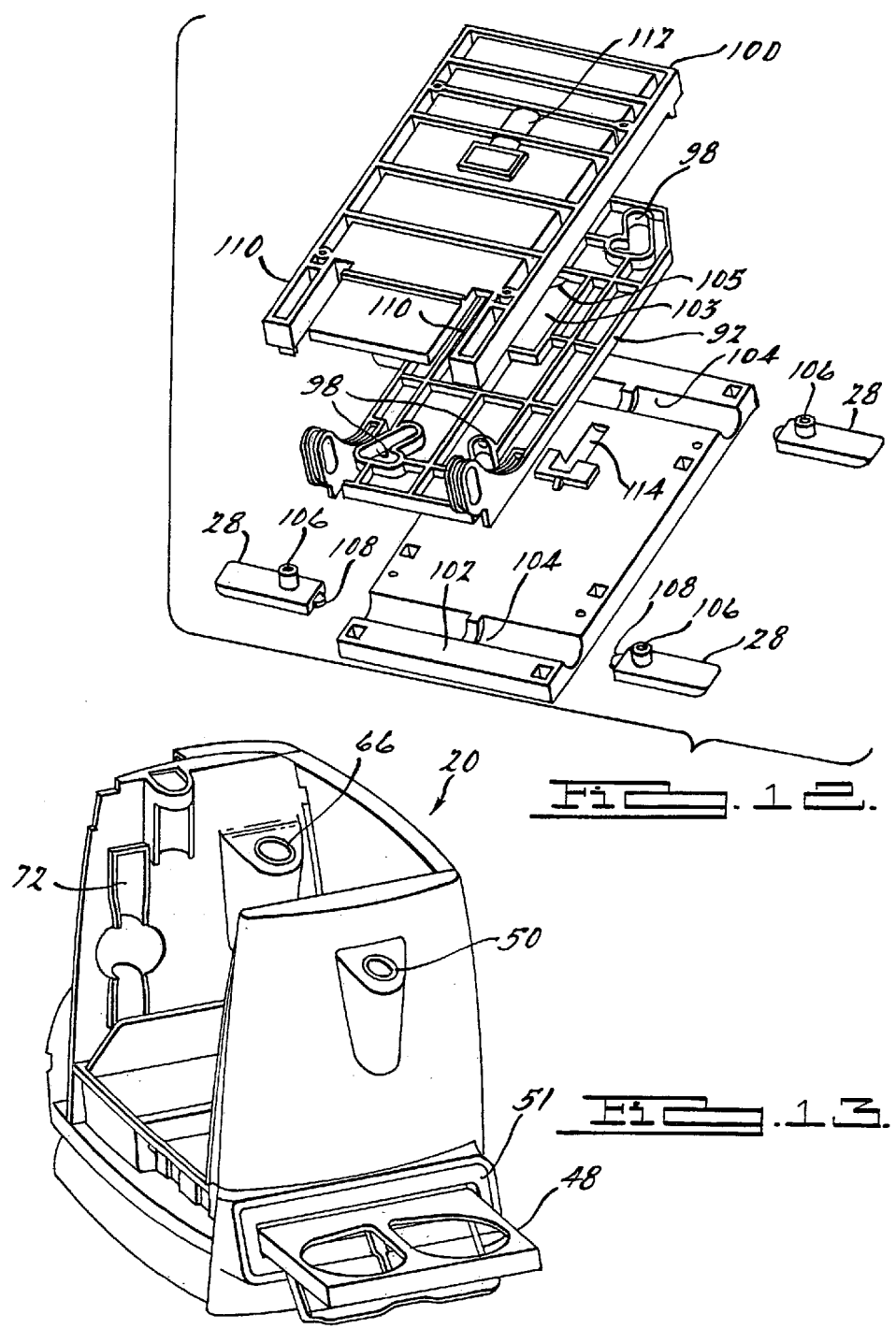

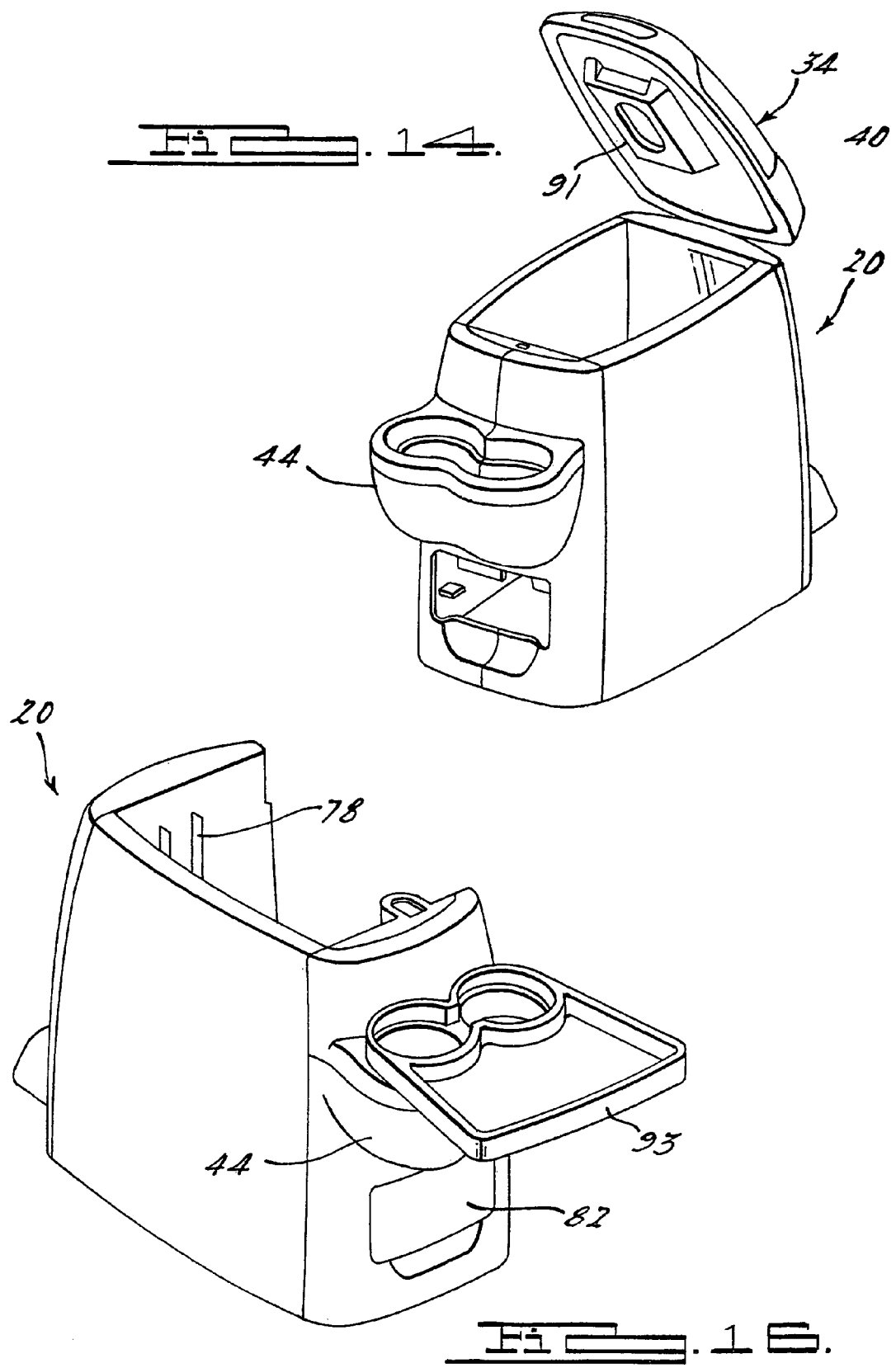

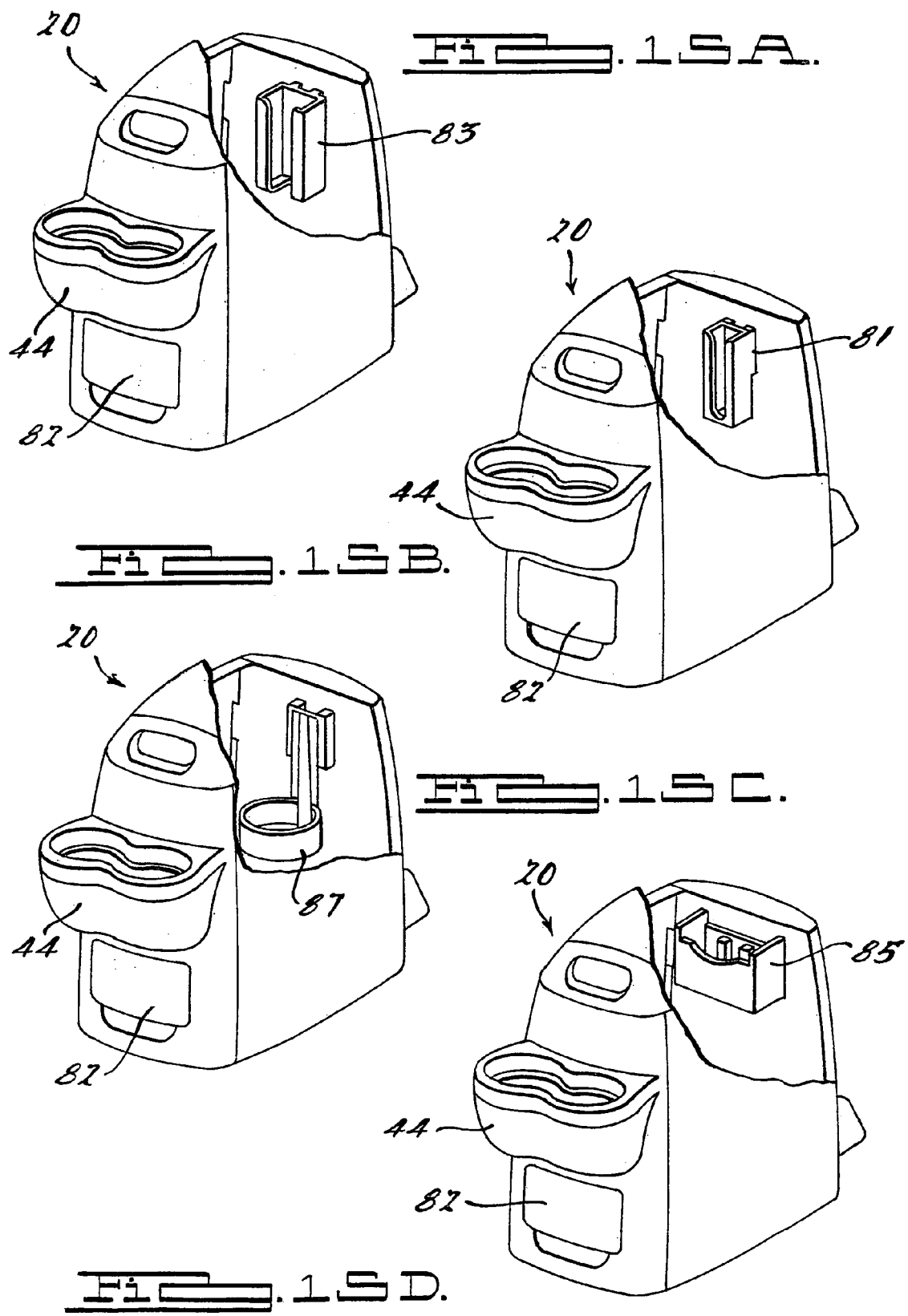

REMOVABLE STORAGE CONSOLE

Continuation of U.S. Provisional Patent Application Ser. No. 60/712,532—Filed: Aug. 29, 2005

TECHNICAL FIELD

The present invention generally relates to a console for a vehicle, and more particularly, relates to a removable storage console for use in an automotive vehicle.

BACKGROUND OF THE INVENTION

Floor consoles have been used in vehicles for many years. The floor consoles may include arm rests with storage compartments, cup holders, ash trays, and the like. Generally, these consoles are mounted to a vehicle by brackets or fastened to the floor of the vehicle by bolts or other fasteners, and once installed they are not intended to be removed from the vehicle. Typically these vehicle consoles for storage of articles are mounted between the seats of the vehicle or in some cases are even included in fixed armrests. Some prior art consoles have been made to be portable and can be attached to the vehicle seats themselves. These consoles provide the vehicle occupants with some storage and usefulness even though restricted space between vehicle seats may reduce the effectiveness of such consoles. Meanwhile, many vehicle owners demand more storage space available within the vehicle. Most prior art consoles and other storage devices are fixed at one location within the automotive vehicle, this may limit potential interior configurations for the vehicle. Therefore, the ability to have a storage console that is removable and relocateable within the vehicle will provide for various interior configurations to be created by the vehicle owner and will also allow the vehicle owner to remove the console if valuables are stored therein and store at a separate location away from the vehicle, if need be.

Furthermore, many of the prior art storage consoles include a bin and cup holder but not many other accessories to accommodate the many articles that vehicle passengers need stored in specific areas to allow for maximized interior space while having a location for every article the vehicle occupants need or want to carry with them in an automotive vehicle.

Therefore, there is a need in the art for a removable storage console that is capable of being placed at various locations within the interior configuration of an automotive vehicle and also being removed from the automotive vehicle for possible storage outside of the vehicle. There also is a need in the art for a removable storage console that includes many features that will be used to store specific items within the console and also allow for electrical connections and power points to extend from the console or within the console. There also is a need in the art for a storage console that reduce the costs for the manufacturer by having a multi function console that is moveable within an automotive vehicle interior.

SUMMARY OF THE INVENTION

It is a general object of the present invention to provide a removable storage console for a vehicle.

According to the present invention, the foregoing and other objects and advantages are obtained by a novel design for a removable storage console. The removable storage console is for use in a vehicle having a floor. The removable storage console is capable of being attached to the floor and removed from the floor via an exterior handle. The console has at least one open side preferably through the top with an inner cavity therein. A lid will provide access to the inner cavity, wherein the lid will have a sliding mechanism that will allow for the lid to be slid in a rearward direction with relation to the storage console. The storage console also includes a release and latching mechanism including the handle mounted to the exterior of the storage console. The latching assembly is generally arranged on a bottom surface of the storage console. The latching assembly will mate with a bracket assembly that is attached to the floor of the automotive vehicle. The storage console may also include a cup holder arranged on a front surface of the console along with a storage tray arranged on a top surface of the slideable lid. The storage console also includes a cup holder arranged on or within a rear surface of the storage console along with an external/internal power point. The internal power point is located within the inner cavity of the storage console. The removable storage console may be located in multiple positions within the automotive interior depending on the design requirements of the automotive manufacturer. The storage console may also include a cell phone holder, a band aid holder, a coin holder, along with tissue or handi-wipe holders and a flash light holder. The storage console will also include an interior light and an electrical connection to the automotive vehicle electronic system. The storage console will include a storage tray located within the cavity of the console that may or may not include a lid and a snap in tray that may be conveniently stored within the inner cavity of the storage console which is capable of being mounted to the cup holder arranged on the front exterior surface of the storage console. A net pocket may also be arranged on a side surface of the exterior of the storage console.

Other objects, features and advantages of the present invention will become apparent from the subsequent description and taken in conjunction with the accompanying drawings.

BRIEF DESCRIPTION OF THE DRAWINGS

FIG. 1A shows a perspective view of the removable storage console according to the present invention.

FIG. 1B shows a perspective view of the removable storage console with the lid slid in a rearward direction according to the present invention.

FIG. 2 shows a front perspective view of the removable storage console according to the present invention.

FIG. 5A shows a bottom view of the removable storage console according to the present invention.

FIG. 5B shows a bottom view of the removable storage console in the release position according to the present invention.

FIG. 10 shows a cutaway view of the interior cavity of the removable storage console.

FIG. 11 shows a cutaway view of the interior cavity of the removable storage console according to the present invention.

FIG. 12 shows an exploded view of the release mechanism according to the present invention.

FIG. 13 shows a rear perspective view of the removable storage console according to the present invention.

FIG. 14 shows a perspective view of the removable storage console with the lid in an open position.

FIG. 15A shows the removable storage console with a cell phone holder mounted in the interior cavity.

FIG. 15B shows the removable storage console with a bandage holder mounted in the interior cavity.

FIG. 15C shows the removable storage console with a cup holder mounted in the interior cavity.

FIG. 15D shows the removable storage console with a wipe holder mounted in the interior cavity.

FIG. 16 shows the removable storage console with a snap in tray according to the present invention.

DESCRIPTION OF THE PREFERRED EMBODIMENT(S)

Figure 3A:
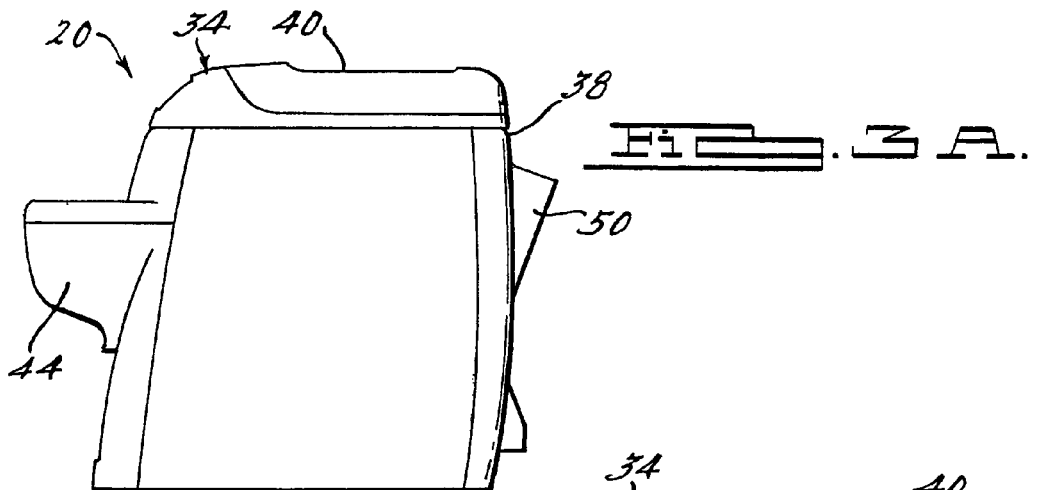
FIG. 3A shows a sideview of the removable storage console according to the present invention.
Figure 3B:
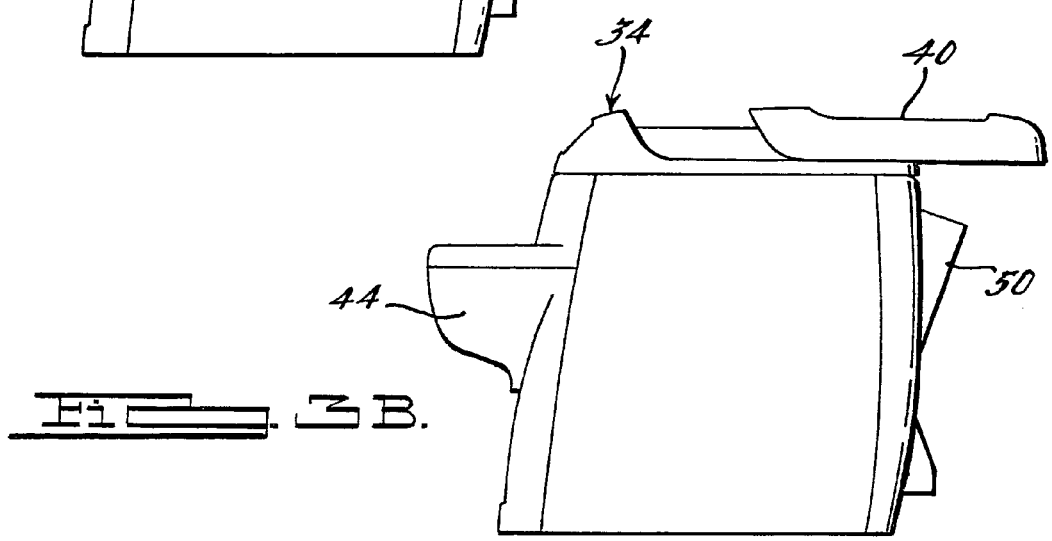
FIG. 3B shows a side view of the removable storage console with the sliding lid slid towards the rear of the vehicle.
Figure 4:
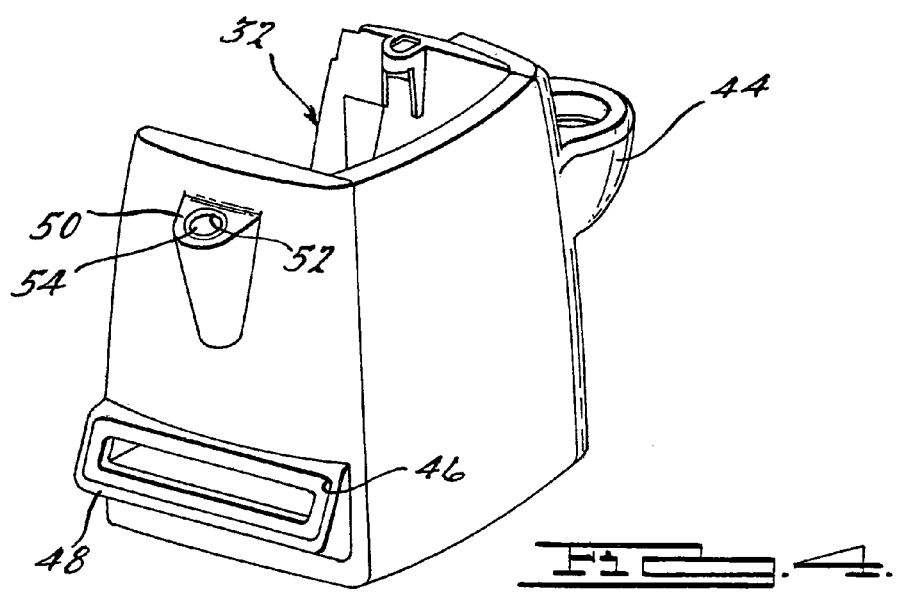
FIG. 4 shows a partial cutaway view of the removable storage console according to the present invention.
Figure 6A:
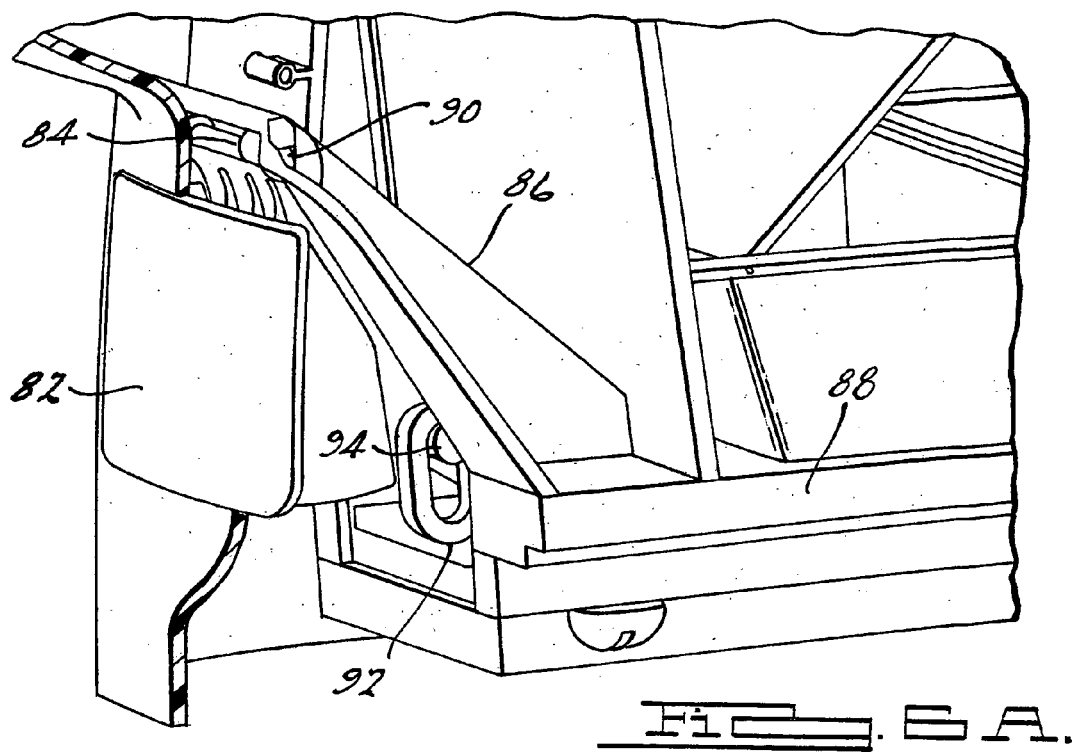
FIG. 6A shows a partial cutaway view of the removable storage console with a handle in a first or home position.
Figure 6B:
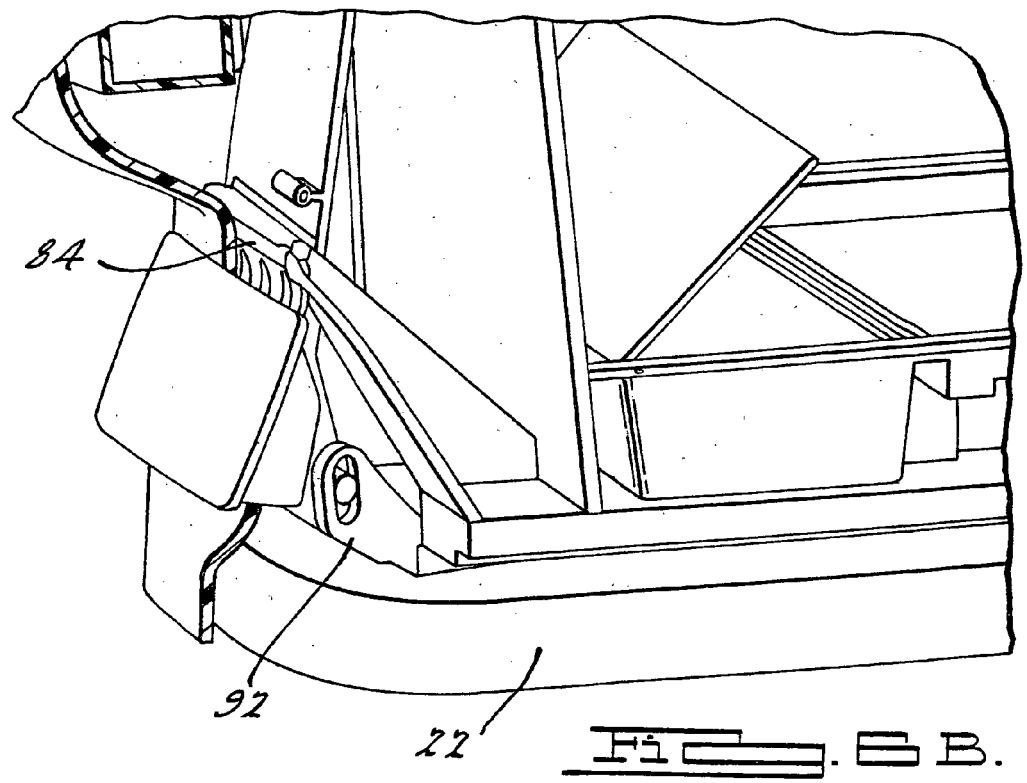
FIG. 6B shows a partial cutaway view of the removable storage console with the handle in a second or release position.
Figure 7:
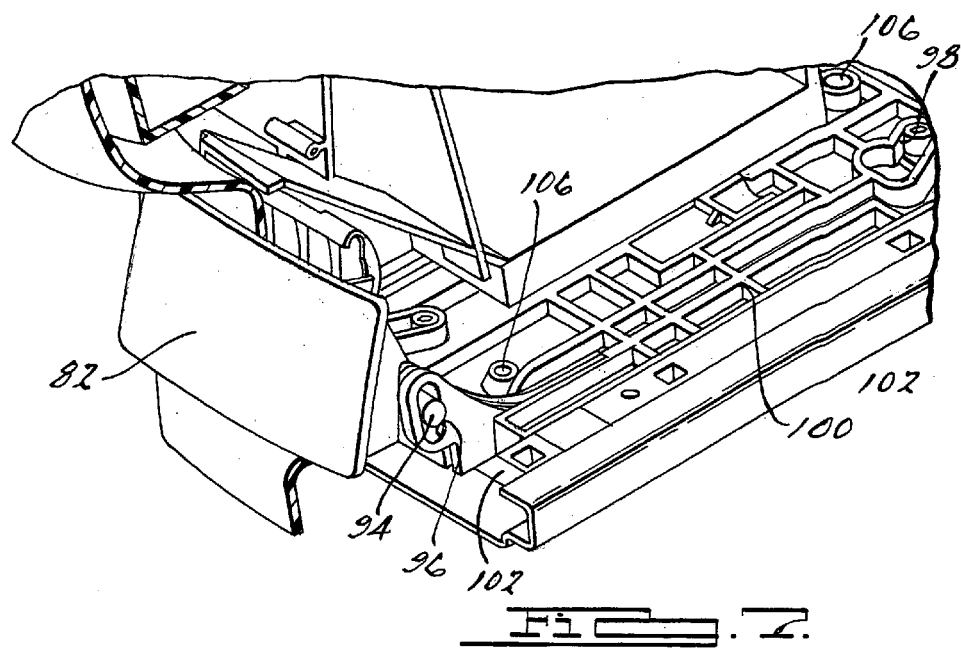
FIG. 7 shows a partial cutaway view of the removable storage console according to the present invention.

Referring to the drawings, FIGS. 1 through 16 show one contemplated embodiment of a removable storage console 20 according to the present invention. The removable storage console 20 may be used in any known vehicle interior. In one contemplated embodiment the console 20 will be capable of being used at multiple locations within the vehicle interior. These locations may be located between the first row seats, the second row of passenger seats, and/or even a third row of passenger seats. However, it should be noted that the removable storage console 20 may be used at other locations within the interior of the automotive vehicle depending on the design requirements and the configuration of such interior components. It should be noted that the removable storage console 20 generally is made of an ABS material, however any other plastic, composite, rubber, metal, natural material, fabric, etc., may be used to construct the removable storage console 20 and all components for use in the interior of the automotive vehicles.

A motor vehicle for which the removable storage console 20 will be arranged within generally has a passenger compartment that may include a first and second row of seats and even a third row of seats in some vehicle configurations. The first row generally includes a driver seat and a passenger seat with a space there between. The second row of vehicle seats is located rearward in the passenger compartment and some may include a pair of seats and/or bench seat depending on the interior configuration. If bucket seats are used in the second or third row of seats a space is generally located there between. The removable storage console 20 of the present invention may be located anywhere within the interior of the automotive vehicle, but is contemplated to be located between the driver and passenger seat or between a first and second seat in a second or third row of the automotive vehicle.

Figure 8A:
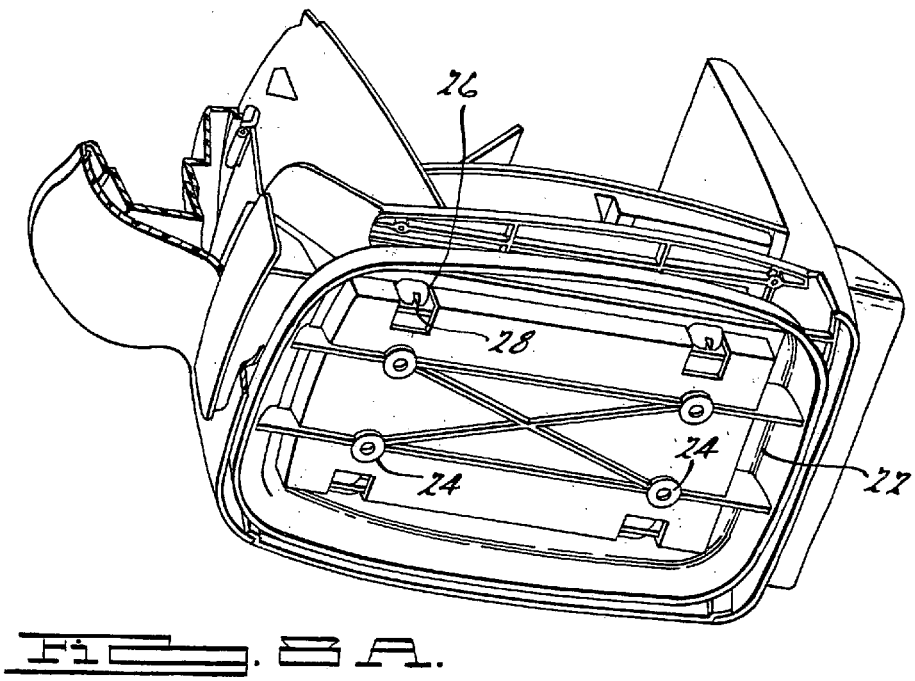
FIG. 8A shows a bottom view of the removable storage console according to the present invention.
Figure 8B:
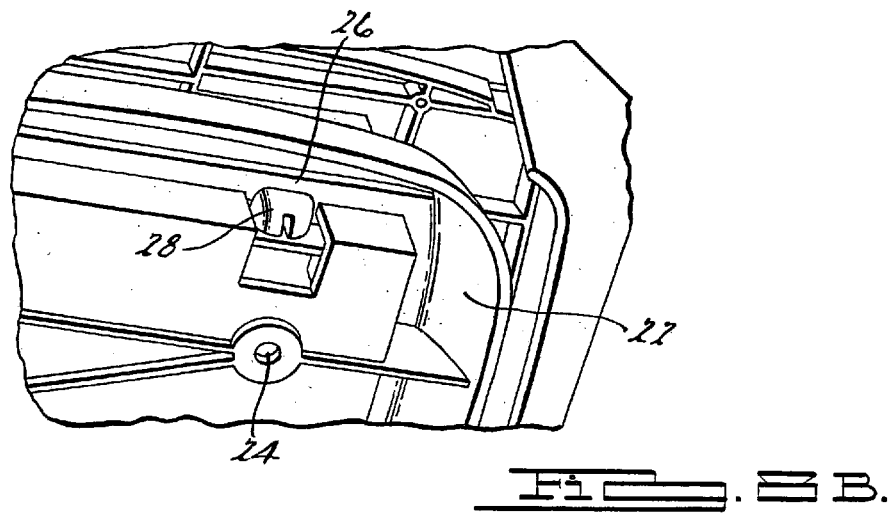
FIG. 8B shows a close up of the removable storage console as shown in FIG. 8A.
Figure 9:
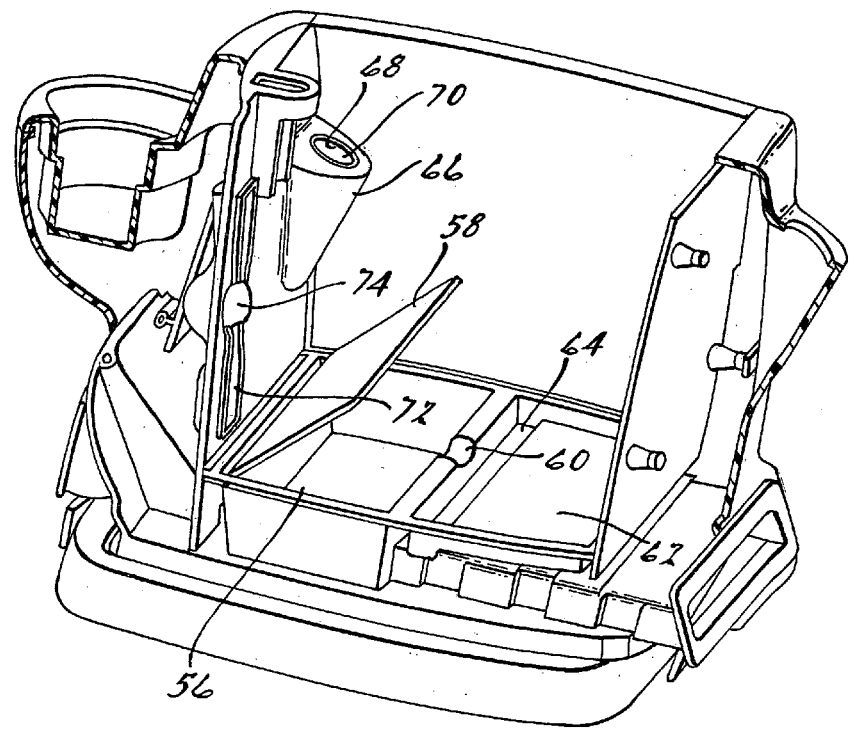
FIG. 9 shows a cutaway view of the interior of the removable storage console according to the present invention.

The removable console 20 includes a base 22 that is secured to the floor of the automotive vehicle. The base 22 enables for a removable attachment of the removable console 20 to a top surface of the base 22. FIG. 8 shows a view of the base 22 which is connected to the vehicle floor via any known fasteners. The base 22 will generally have a shape that mimics that of a bottom portion of the removable storage console 20. The base 22 will have a plurality of orifices 24 through a surface thereof. Fastener will be arranged through the orifices 24 and into the floor which will secure the base 22 to the vehicle floor. A plurality of bases 22 may be arranged and secured to the vehicle floor at predetermined positions within the vehicle interior such as between the front passenger and driver seat, a second row first and second seat, and a third row first and second seat. The bases 22 may have a cover placed there over when the removable console 20 is not secured within the base 22 at such a position. The base 22 will also include a plurality of locking shoulders 26 which will engage with a latch mechanism 28 that is attached to a bottom surface of the removable console 20. The plurality of locating shoulders 26 are arranged in a predetermined pattern to ensure that a first and second latch 28 will be arranged and secured on each side of the removable console 20. Thus, in one contemplated embodiment the latch mechanisms 28 will engage, interact and lock with the base 22 to ensure the removable console 20 does not slide or move within the interior of the automotive vehicle or dislodge during operation of the motor vehicle. It should be noted that in the embodiment shown it discloses only one contemplated embodiment for latch mechanisms but that any other number of latch mechanisms are contemplated to be used to secure the removable console 20 to the base 22 within the interior of the automotive vehicle. It should be noted that the base 22 is generally made of a hard plastic material however, any other plastic, rubber, composite, metal, or any other known material may be used to make the base 22 into its predetermined shape. It should be noted that the base 22 may also act as a tray or other holding device when the removable storage console 20 is not attached thereto in one contemplated embodiment.

The console 20 includes a main body 30 having an inner cavity 32 that defines an interior of the removable console 20. In the embodiment shown the removable console 20 has an opening at a top end thereof. The opening is covered by a lid 34 that is secured to the top of the console body 30 by a latch mechanism 36 on one end and by a hinge 38 on the rearward end. The lid 34 generally pivots open in a rearward direction. However, it should be noted that it is contemplated to have the lid 34 pivot in a forward direction, towards the passenger, or towards the driver of the automotive vehicle. These contemplated pivot directions are also applicable to the removable storage console in its other possible locations throughout the automotive interior. The lid 34 will also include a sliding cover 40 which may act as an arm rest or other device for the occupants of the automotive vehicle. In the preferred embodiment the sliding cover 40 of the lid 34 will slide in a rearward direction towards the rear of the automotive vehicle. Any known latch, hinge and sliding mechanism may be used for the removable storage console 20 according to the present invention. Some such systems are already in use by the Applicant and may be incorporated into the design including those patented or applied for patents by the Applicant.

The cover 40 of the rearward sliding lid 34 also includes a small cavity or depression 42 therein which will provide a storage tray 42 for use by the occupants of the vehicle. The storage tray 42 is preferably molded into the top portion of the cover 40 of the rearward sliding lid 34. However, it is also contemplated to have a removable storage tray arranged within an orifice of the cover 40 of the rearward sliding lid 34. The rearward sliding lid 34 will be capable of sliding in the rear direction of the vehicle a predetermined distance depending on the design requirements and strength needed for the lid 34. It is also contemplated to have the lid 34 slide in a forward direction in another embodiment.

The removable storage console 20 also includes a fixed front cup holder 44 arranged on a front surface of the removable storage console 20. In the embodiment shown the cup holder 44 has a generally "FIG. 8" appearance when viewed from above and includes a storage space for a first and second cup or the like. It should be noted that the cup holder 44 may have any known appearance. The fixed cup holder 44 is molded directly into the front surface of the removable console 20. However, it is also contemplated to have a fixed cup holder 44 that is attached to the front surface of the removable console 20 by any known latch or fastener mechanism capable of holding the fixed cup holder 44 at a predetermined position on the front surface of the removable console 20. The fixed cup holder 44 generally has a first and second storage space or cavity that are deep enough to hold both standard and oversized cups, bottles or the like. It should also be noted that the cup holder 44 is arranged on the front surface such that the passenger and driver of the automotive vehicle can easily access the holder and its contents.

A rear surface of the removable storage console 20 includes an orifice near a bottom portion thereof. The cavity 46 has a cup holder 48 arranged therein. The cup holder 48 is stored within the interior of the removable storage console 20 when the cup holders 48 are not in use. When the cup holders 48 are needed the automotive occupant seated near the rear section of the removable storage console 20 will remove the cup holder 48 from the rear interior portion of the removable console 20 until the cup holder 48 extends from the bottom rear surface of the console 20 and is capable of being used by the occupants. In the embodiment shown a push-push cup holder 48 is the preferred cup holder to use within the removable console 20. The push-push cup holder 48 includes a cassette 51 which is inserted into the orifice 46 of the rear surface of the console 20 and is secured within the interior of the console by any known securing mechanism. The push-push cup holder 48 will allow for the device to be pushed in to allow for a first and second cup holder 48 to extend from the surface of the rear of the console 20. It should be noted that any other known type of cup holder is capable of being used on the rear surface of the console 20 including but not limited to any cup holder that is capable of being stored on the interior of an object and extended from such object when in its used position. These include but are not limited to pull cup holders, push pull cup holders, push-push cup holders, pull down cup holders, etc. Arranged above the cup holder 48 on the rear surface of the storage console 20 is an external power point 50. The external power point 50 is located near the top end of the rear surface of the console 20. It is located such that the rearward sliding lid 34 may slide over the top of the power point 50 without interference by the exterior power point 50. The exterior power point 50 includes a body that extends outward from the rear surface of the removable console 20. A generally circular orifice 52 is located at a top of the power point body. The orifice 52 will have a sleeve 54 arranged therein that will receive and hold a power plug that will be capable of operating electronic devices for passengers in the rear portion of the automotive vehicle. Electronics and wiring will be connected to an end of the exterior power point 50 and connected to an electronic connection that is arranged near a bottom surface from the removable console 20.

A net pocket may also be arranged on any of the outer surfaces of the removable console 20 but preferably the outer side surfaces such that a passenger and/or driver of the automotive vehicle may store items within the net pockets on the exterior of the removable console 20. It should also be noted that it is contemplated to mold pockets directly into the side surfaces of the removable console 20 such that storage pockets may be located on both sides or one side of the surface of the removable console 20.

The interior cavity 32 of the removable console 20 will include an area for storage of items within the storage console 20. The bottom of the interior cavity 32 will contain a covered storage member 56 that may include a cover or lid 58 over the member 56. The storage member 56 may have a lid 58 that pivots in any of four directions to provide covered storage at the bottom of the interior cavity of the removable storage console 20. The storage member 56 may also include a notch 60 in one end thereof to allow for easy opening of the lid 58 when the lid 58 is in a closed position. Adjacent to the covered storage member 56 will be another tray 62 that may or may not have a plurality of holders 64 therein for CD's, cassettes, pens, or other media or components. It is also contemplated to have just a bin with no holders 64 therein. The second storage tray 62 is adjacent to the covered storage member 56 at the bottom surface of the interior cavity 32 of the removable storage console 20. Located on an interior front wall of the interior cavity 32 of the removable storage console 20 is an internal power point 66 that generally will extend a predetermined distance from the wall and include a circular orifice 68 at a top end thereof. Located within the orifice 68 is a sleeve 79 that will receive a power point plug from any known electronic media. At an end of the interior power point 66 will be electronics and wiring that will connect to the electrical connection located on the bottom surface of the removable console 20.

The front wall of the interior cavity 32 of the removable console 20 is a flash light holder 72 that is molded within the wall. The flash light holder 72 will include an indentation with a notch 74 therein to allow for removal and insertion of a flash light therein. The front wall will also include a lighted switch 76 that will provide a light within the interior of the removable console 20 when the lid 34 is in its open position. It should be noted that the lighted switch 76 will also include a switch that will allow for light to be left on, off or on at intermittent times depending on the requirements of the vehicle occupants. The preferred operation of the lighted switch 76 is that when the lid 34 is in its open position a light will come on, thus illuminating the interior of the removable console 20 for easy storage and removal of items therein. Appropriate electrical connections will extend from the lighted switch along a space arranged between the front wall of the interior cavity 32 and the exterior surface of the removable console 20.

Arranged on a back wall of the interior cavity 32 of the removable console 20 is a mounting bracket 78 that will be capable of receiving a plurality of accessories. Accessories that may be mounted to the bracket 78 are a bandage holder 81, a coin holder (not shown), a cell phone holder 83, wipe holder 85, internal cup holder 87, or the like or a hook or other hanging device may be connected to the mounting bracket to allow for hanging of a small purse, hat or the item within the removable console 20. Arranged on a bottom surface of the slidable lid 34 is a tissue holder 91 that is molded directly therein. The tissue holder 91 is sized such that it can handle a full box of tissues, a travel pack of tissues, or a travel pack of handi or diaper wipes within the bottom portion of the lid 34. When the lid 34 is in its open position the tissues or handi-wipes will be readily accessible to occupants within the automotive vehicle. It is contemplated to mold multiple recessed surfaces or surfaces that extend from the bottom portion of the slidable lid 34 while also including a bracket to hold the carton or bag of wipes or tissues within the recessed portion in the lid 34.

The removable storage console 20 also may include a snap in tray 93 that is arranged within the fixed cup holder 44 on the front surface of the removable storage console 20. The snap in tray 93 may include a plurality of fingers or locking members arranged on an end of a bracket that will extend over or into the fixed cup holder 44 and snap in place to the cup holder 44 to provide a firm and secure base for the snap in tray. It is also contemplated to have a snap in tray 93 that uses an interference fit to secure the tray within the cup holder 44. The interference fit uses a first and second projection that are arranged in the cup holder 44 and have a predetermined diameter that creates a predetermined force or fit between the tray 93 and cup holder 44. The tray 93 will extend in a forward direction in the automotive vehicle to provide an accessory tray for the driver, passenger or rear seat passengers in the automotive vehicle. The snap in tray 93 will generally have a tray with edges raised a predetermined distance so that items placed on the tray will not become dislodged during operation of the automotive vehicle. The tray 93 will allow for an automobile passenger to place writing instruments, computers, cell phones, pens, papers and other items on the tray during operation of the automotive vehicle or while the automotive vehicle is parked. The snap in tray 93 may be stored within the interior cavity 32 of the removable storage console 20 in one contemplated embodiment or may be stored at other locations within the interior of the automotive vehicle. The snap in tray 93 will create more usable space and surface area for the occupants of the vehicle without compromising cup holder use. The tray 93 will have a first and second container holder member within the tray 93 by molding or machining cavities into the projections. It is also possible to have the tray 93 arranged in the rear cupholder 48 via an interference fit or any other known fastening method.

It should be noted that all of the features discussed above may be used in the removable console 20 or only selected features may be incorporated into the removable console 20 depending on the design requirements and consumer requirements for the manufacturer of the removable console 20 and the vehicle into which the removable console 20 will be placed in the interior thereof. It should also be noted that other contemplated trays and components may be used on any outside surface of the console 20 or any interior surface of the console 20. An electrical connection unit is arranged on a bottom surface of the removable storage console 20 and mates with an electrical connector permanently connected to the vehicle battery located on a surface of the base 22 or vehicle floor. Therefore, when the removable console 20 is securely fixed to the base 22 the electrical connector of the base 22 will interact with the electrical connection on the bottom portion of the removable console 20 and provide electric power to be distributed throughout the removable console 20 to the light and power points as necessary. Any known electrical connection is capable of being used on both the bottom surface of the removable console 20 and the base 22.

The removable console 20 includes a release mechanism 80 arranged on the bottom surface of the removable console 20. The release mechanism 80 includes a handle 82 that is arranged on a bottom portion of a front surface of the removable console 20 below the fixed cup holder 44. The handle 82 is arranged within an indentation of the removable console 20 such that a users hand can grasp one end of the handle and move the handle between a home position and a release position. The home position generally has the handle 82 parallel to the outer surface of the removable console 20 and in the released position the handle 82 rotates about a pivot point near a top portion of the handle 82. The handle 82 includes a pivot point channel 84 at a top end thereof which is connected to a flange 86 extending from the bottom portion 88 of the interior cavity 32 of the removable console 20. This will allow for the handle 82 to have a pivot point at a predetermined position with relation to the outer surface of the removable console 20. In one contemplated embodiment a metal rod will be arranged through the pivot point channel 84 and through a first and second orifice 90 of the flange 86 of the bottom portion 88 of the interior cavity 32.

The release mechanism 80 also includes a link member 92 connected to the handle 82 near a bottom portion of the handle 82. The handle 82 has a first and second post 94 extending from a side surface thereof. The posts 94 are arranged on opposite sides of the handle 82 and will allow for connection to the link member 92. The link member 92 has a first and second channel or track 96 arranged on opposite sides thereof that interact with and mate with the posts 94 of the handle 82. The posts 94 of the handle 82 are arranged within the first and second channel 96 and are slidably moveable within the track 96.

The link member 92 includes a plurality of tracks 98 through a surface thereof. In the embodiment shown there are four tracks arranged near each corner of the link member 92. The tracks generally have an "L" shape or "7" shape. The longer portion of the track 98 is angled at a predetermined angle from the shorter portion of the track 98. The link member 92 also includes a generally square or rectangular orifice 103 through a surface thereof. The orifice 103 includes a projection 105 extending into the orifice from a wall thereof. It should be noted that while the general shape of the tracks 98 have an "L" shape, any other shape and any known angle can be used to create the generally "L" shaped tracks 98 for the link member 92. The latch 28 includes a post 106 extending from a surface thereof. The post 106 will be arranged within the track 98 of the link member 92. The latch 28 will also include a peg 108 extending from an end thereof. The peg 108 will have a spring arranged thereover. The spring will urge the latch 28 into its extended or outward position to interact with the shoulder 26 of the base 22. The tracks 98 will interact with the posts 106 of the latches 28 wherein the post 106 will slide along the angled surface of the track 98 and urge the latch 28 in an inward direction toward the center or middle of the link member 92, when the link member 92 is moved toward the front of the removable console 20 via the handle 82. This will allow for all of the latches 28 to be moved in an inward direction toward the center of the link member 92 and clear the locking shoulder 26 of the base 22 and allow for removal of the console 20 from the base 22. The posts 106 sliding along the angled and longer leg of track 98 will create the necessary force to overcome the spring force urging the latches 28 in an outward direction and move the latches in an inward direction toward the center of the link member 92 thus allowing for clearance of the locking shoulder 26 by the latches 28.

The release mechanism 80 also includes an upper housing 100 and a lower housing 102. The upper housing 100 includes a first and second groove 110 which will allow for movement between the link 92 and the upper housing 100 and lower housing 102. The upper housing 100 also includes a channel 112 located near a center point thereof. The channel 112 will align with the extension 105 of the link member 92, thus allowing for the extension 105 to slide within channel 112. The upper housing 100 will connect, via any known fasteners, to the underside of the bottom portion of the interior cavity 32 of the removable console 20. The lower housing 102 includes at least one track 104 in which latches 28 will be slidably movable with respect to an outer edge of the lower housing 102. The latches 28 will be arranged within the tracks 104 of the lower housing 102. The lower housing will also include a channel 114 near a center point thereof and align with channel 112 and extension 105. Extension 105 will also be slidingly moveable within channel 114 of the lower housing 102. A spring will be arranged over the extension 105 and in contact with a surface of the lower housing 102 and upper housing 100. The spring will urge the link member 92 towards the home position. The upper housing 100 and lower housing 102 will be fixed with relation to each other and may include fasteners arranged therebetween to secure the lower housing 102 to the upper housing 100. It should be known that any known fasteners may be used to connect the upper housing 100 to the lower housing 102. The upper and lower housings 100, 102 generally have rectangular shapes, however any other shape can be used depending on the overall shape of the removable console 20. It should also be noted that handle 82, upper housing 100, lower housing 102 and latches 28 are generally made of a plastic material, however any other metal, ceramic, composite, fabric or the like material may be used for these components. The latch 28 is urged into its latched or locked position in an outward direction via a spring arranged between opposing latches 28 or between a latch 28 and shoulder surface on the lower housing 102. The extension 105 of link member 92 will slide with relation to the upper housing 100 and lower housing 102 a predetermined distance as defined by the length of the channel 112 and channel 114 of the release mechanism 80. When the handle 82 is released back to its home position the springs engaging latches 28 will urge the latches 28 in an outward direction, thus allowing the latches 28, via post 106, to slide along channel 98 to its locked or home position.

In operation, the operator of the automotive vehicle will align the removable console 20 with the base 22 either via an alignment mechanism or any other known method of aligning a base 22 with a removable console 20. The operator will insert, with the desired force, the removable console 20 onto the base 22 which will, via a curved surface of the latches 28, engage and urge the latch 28 into the lower housing 102 thus allowing for the latch 28 to slide over the locking shoulder 26 until the flat top edge of the latch 28 engages with the locking shoulder 26 and holds the removable console 20 securely to the base 22. During this alignment the electrical connection located on the lower portion of the removable console 20 will connect to and create an electrical connection to the electrical connector located on the base 22. When the user wants to remove the removable console 20 from the base 22 and move it to another location within the interior of the automotive vehicle or move to an outside storage location the user will grasp the handle 82 and pull the handle 82 in a forward direction towards the front of the removable console 20. This will pivot the handle 82 about the pivot point and in turn move the link member 92, via the posts 94 and channels 96 towards the front of the removable console 20 and release the latches 28 from the locking shoulder 26 by having the latches 28 move in an inward direction toward the middle of the link member 92 and within the side surfaces of the lower housing 102. This will allow for the user to lift up the removable console 20 and remove the console 20 to a second location or storage at location away from the vehicle.

Other contemplated embodiments may also be designed and shown from the above mentioned discussion and the attached drawings to include any known designs in the art for a removable storage console.

While it may be apparent that the preferred embodiment of the invention disclosed is well calculated to fill benefits, objects, or advantages of the invention, it will be appreciated that the invention is susceptible to modifications, variations and change without departing from the proper scope of the invention as shown and described.

What is claimed is:

1. A removable console for use in a vehicle, said console including:
    a base;
    a body;
    an upper housing secured to a bottom of said body;
    a handle arranged on an outer surface of said body;
    a link member connected to said handle;
    a lower housing arranged adjacent to said link member, said link member is arranged between said upper housing and said lower housing, said link member is slidable with respect to said upper and lower housing;
    a plurality of latches arranged between said link member and said lower housing; and
    said plurality of latches are selectively releasable from said base.

2. The console of claim 1 wherein said base having a plurality of locking shoulders that align and mate with said plurality of latches.

3. The console of claim 1 wherein said handle is movable between a home and release position.

4. The console of claim 1 wherein said upper housing having a first and second groove, said upper housing having a channel that aligns with an extension of said link member.

5. A removable console for use in a vehicle, said console including:
    a base;
    a body;
    an upper housing secured to a bottom of said body;
    a handle arranged on an outer surface of said body;
    a link member connected to said handle, and said link member having a first and second channel, said first and second channels having a portion of said handle arranged therein;
    a lower housing arranged adjacent to said link member;
    a plurality of latches arranged between said link members and said lower housing; and
    said plurality of latches are selectively releasable from said base.

6. A removable console for use in a vehicle, said console including:
    a base;
    a body;
    an upper housing secured to a bottom of said body;
    a handle arranged on an outer surface of said body;
    a link member connected to said handle;
    a lower housing arranged adjacent to said link member;
    a plurality of latches arranged between said link member and said lower housing, said link member having a plurality of tracks therein, said latches having posts that will slide within said tracks to move said latches between an extended lock position and a released position; and
    said plurality of latches are selectively releasable from said base.

7. The console of claim 1 wherein said latches are urged in an extended lock position by a spring.

8. The console of claim 1 wherein said lower housing having a plurality of tracks, said latches are slidingly movable within said tracks.

9. A removable console for use in a vehicle, said console including:
    a base;
    a body;
    an upper housing secured to a bottom of said body;
    a handle arranged on an outer surface of said body;
    a link member connected to said handle;

a lower housing arranged adjacent to said link member, said lower housing having a channel therein, said channel aligns with an extension of said link member, a spring arranged within said channel and over said extension, said spring urges said link member to a home or locked position a plurality of latches arranged between said link member and said lower housing; and said plurality of latches are selectively releasable from said base.

10. The console of claim 1 wherein said body having a removable tray arranged on an outer surface thereof.

11. The console of claim 1 wherein said body having a fixed cupholder on a front surface and a push-push cupholder arranged in a rear surface thereof.

12. The console of claim 1 wherein said body having an inner cavity, said inner cavity having a power point, a light, a flashlight holder and an accessory mounting bracket arranged therein.

13. The console of claim 12 wherein said accessory mounting bracket including a cell phone holder, bandage holder, wipe holder or coin holder.

14. The console of claim 1 further including a slidable lid pivotally attached to said body.

15. A removable console for use in a vehicle having a floor and multiple positions available for securing and holding the removable console, said console including:
　　at least one base secured to the floor;
　　a body having an inner cavity, said body connected to said at least one base;
　　a handle arranged on an outer surface of said body;
　　a link member engaged with said handle and slidable between a home and release position;
　　an upper housing secured to a bottom portion of said inner cavity;
　　a lower housing secured to said upper housing; and
　　a plurality of latches arranged between said lower housing and said link member.

16. The console of claim 15 further including a slidable lid pivotally attached to a top of said body.

17. The console of claim 15 further including a fixed cupholder arranged on a front surface of said body and a push-push cupholder arranged in a rear surface of said body.

18. The console of claim 17 further including a tray that is arranged within said fixed or push-push cupholder, said tray increases outer usable surface without compromising cupholder use.

19. The console of claim 15 wherein said inner cavity having a flashlight holder therein and a light therein.

20. The console of claim 15 wherein said inner cavity having an accessory mounting bracket therein and covered storage on a bottom of said inner cavity.

21. The console of claim 15 further including an exterior power point on a rear surface of said body.

22. A removable console for use in a vehicle, said console including:
　　an upper housing;
　　a lower housing secured to said upper housing;
　　a link member arranged between said upper housing and said lower housing, said link member is slidable with respect to said upper and lower housing;
　　a plurality of latches contacting said lower housing and said link member; and
　　a handle engaged with said link member and movable between a home and release position.

23. The console of claim 22 further including a spring which urges said latches into an extended position when said handle is in said home position.

24. The console of claim 22 further including a spring arranged between said link member and said upper housing and said lower housing.

* * * * *